United States Patent [19]
Patterson

[11] 3,774,575
[45] Nov. 27, 1973

[54] AQUARIUM
[76] Inventor: Carol M. Patterson, P.O. Box 1151, Bryan, Tex. 77801
[22] Filed: July 26, 1972
[21] Appl. No.: 275,315

[52] U.S. Cl. ..................................... 119/5, 308/3.8
[51] Int. Cl. ............................................ A01k 64/00
[58] Field of Search ..................... 119/5, 15, 17, 43; 308/3.8; 312/341 R, 343, 344, 348

[56] References Cited
UNITED STATES PATENTS
2,726,915  12/1955  Schuette ........................ 308/3.8 X
2,747,943  5/1956  Metcalf ............................ 312/344 X
2,985,491  5/1961  Hayes .................................. 308/3.8

Primary Examiner—Louis G. Mancene
Assistant Examiner—J. N. Eskovitz
Attorney—Pravel, Nilson et al.

[57] ABSTRACT

An aquarium unit including a frame, a tray having an aquarium compartment thereon being mounted with the frame for slidable movement and positioning means for maintaining the tray and aquarium compartment substantially horizontally even when pulled outwardly of the frame.

5 Claims, 3 Drawing Figures

AQUARIUM

BACKGROUND OF THE INVENTION

The field of this invention is aquariums, particularly multi-unit aquariums.

In conducting research with aquatic animals, it is desirable to isolate in a consistent environment individual or small groups of animals for experimentation. In order to provide such an isolated environment, individual aquarium tanks are generally used; however, such aquarium tanks filled with water are very difficult to handle, particularly in large numbers. The handling difficulties are due not only to the weight, but also the difficulty in handling the tanks without spilling water.

SUMMARY OF THE INVENTION

It is an object of this invention to provide a multi-unit aquarium that is capable of isolating aquatic animals in such a manner that the animals are readily available for inspection and experimentation. This object and other objects of this invention are accomplished by providing a multi-unit aquarium which includes a rack having a tray mounted thereon for slidable movement inwardly and outwardly of the rack. An aquarium compartment is mounted on the tray and positioning means are provided for maintaining the aquarium compartment in a substantially stable and horizontal position even when the compartments and trays are pulled outwardly of the rack. In the preferred embodiment of this invention, a plurality of such trays are independently mounted for movement outwardly of the rack, each tray having positioned thereon an aquarium compartment whereby a multi-unit aquarium is formed.

The trays are maintained in a substantially horizontal position by rollers mounted onto the tray and positioned to rollingly engage upper and lower track sections mounted with the rack. In this manner, the tray and aquarium compartment filled with water can be pulled outwardly from the rack and yet be maintained in a substantially horizontal position.

DESCRIPTION OF THE PREFERRED EMBODIMENT

Figure 1:
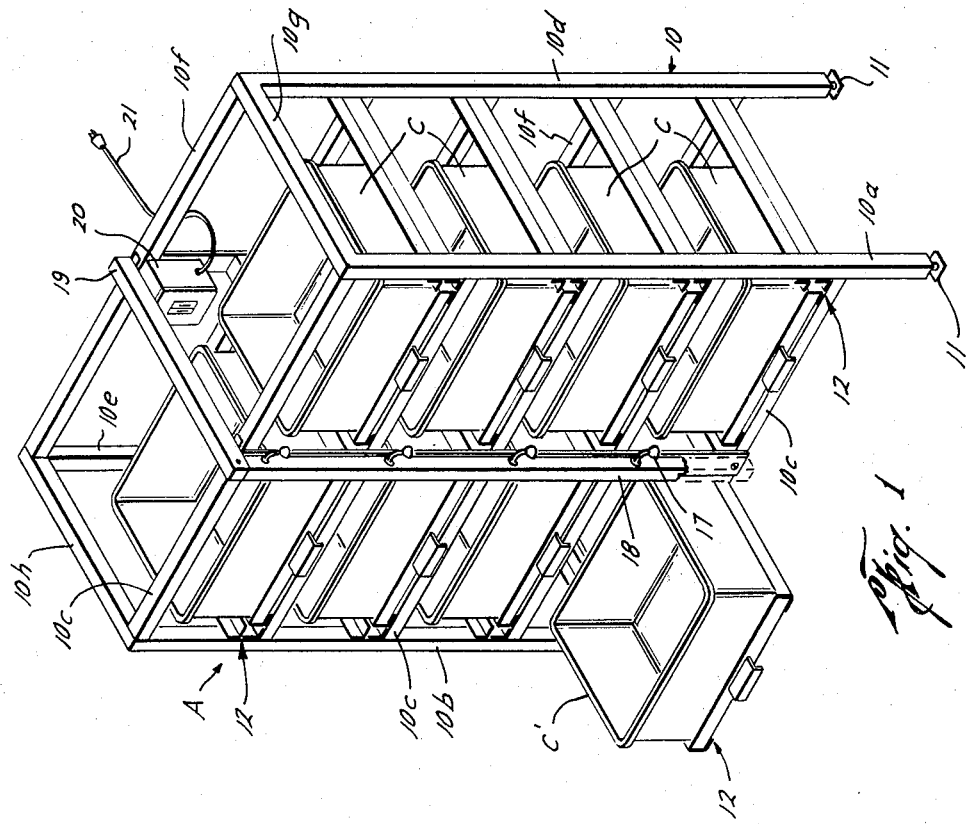
FIG. 1 is a perspective view of a multi-unit aquarium of the preferred embodiment of this invention illustrated with one of the aquarium compartments pulled outwardly of the unit.

With reference to the drawings, the letter A generally designates a multi-unit aquarium wherein a plurality of aquarium compartments C are maintained in a relatively confined area in such a manner that each individual compartment is readily accessible for inspection. The multi-unit aquarium A includes a frame or rack generally designated as 10 that is adapted to house the plurality of individual aquarium compartments C. The rack 10 includes front, vertical legs or supports 10a and 10b which are connected by a plurality of horizontally positioned rods 10c. The rack 10 further includes rear, vertical legs or supports 10d and 10e which are joined by a plurality of horizontal rods 10f attached therebetween. The front legs 10a and 10b are connected with the rear legs 10d and 10e by upper side rods 10g and 10h. In the preferred embodiment of this invention, the various legs, rods, and supports are extruded aluminum and are connected or attached together by welding. Each of the vertical legs, 10a, 10b, 10d and 10e have mounted on the bottom thereof conventional leveling plates 11 in order to adjust the rack 10 to a horizontal position in spite of a sloping or uneven floor.

Figure 2:
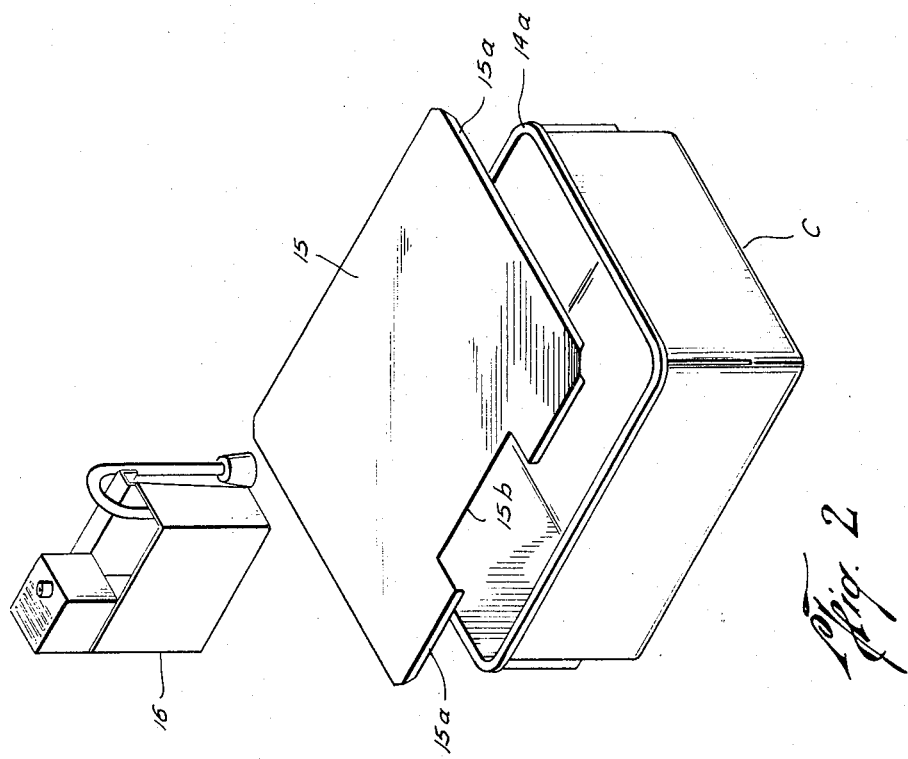
FIG. 2 is a perspective view of an aquarium compartment.

Each of the aquarium compartments C are mounted in the rack 10 by a sliding tray assembly generally designated as 12 such that each compartment C can be normally housed within the confines of the rack 10 but may be pulled outwardly to the position of the compartment designated as C' whenever desired. Referring to FIG. 2, each compartment C is a four-walled transparent polycarbonate plastic basket or cage having an upper lip 14a. A lid 15 of steel or other suitable material includes a lipped portion such as 15a which adapts the lid for placement over the corresponding lipped portion 14a of the compartment C. A recess 15b is machined in the lid 15 in order to receive and mount a conventional aerator system 16. The aerator system 16 may be of any conventional variety and may include a pump, a filter and an aerator system. Each aerator system 16 for each compartment C in the rack 10 is adapted for electrical connection to one of a number of local electrical outlets 17 which are positioned adjacent to the compartments C. The electrical outlets 17 extend outwardly from a conduit or tube 18 which is mounted onto a vertical bar 33 that is attached to the front horizontal bars 10c of the rack 10. The electrical wiring for the outlets 17 extend through the vertically mounted conduit or tube 18 and through a horizontally mounted conduit 19 attached to the vertical conduit 18, and into electrical connection with a breaker box 20. The breaker box 20 includes a conventional electrical plug line 21 adapted to be extended into any conventionally located electrical outlet (not shown). The breaker 20 controls the distribution of power to each of the compartment outlets 17 in order to prevent the overloading thereof. The confining of the electrical wiring of the outlets 17 to the conduits 18 and 19 is an additional safety feature of the multi-unit aquarium A.

Figure 3:
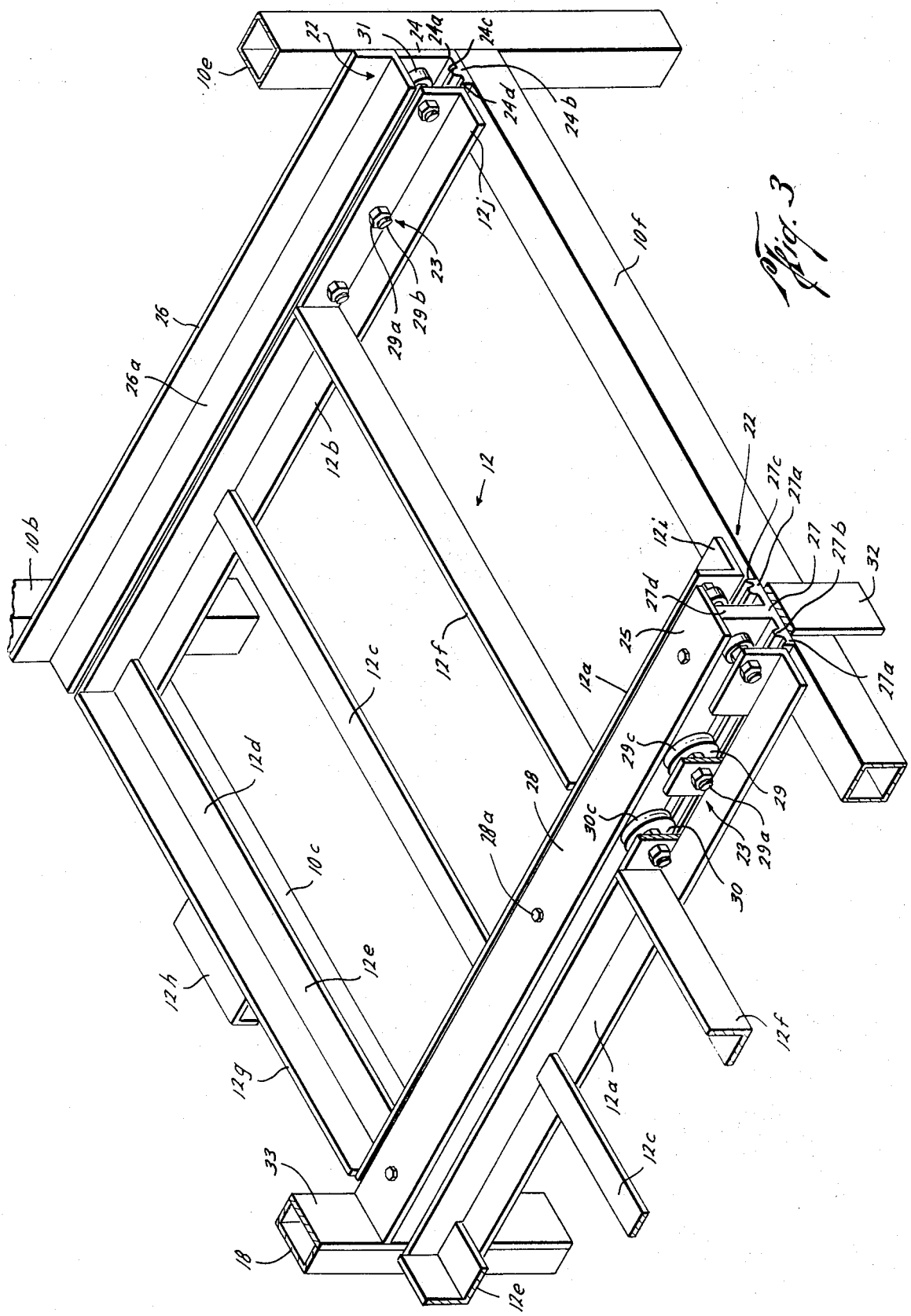
FIG. 3 is a rear view in perspective of the positioning means of this invention.

Each sliding tray assembly 12 is rollably mounted in a track means generally designated as 22 mounted with the rack 10 whereby the sliding tray assembly and aquarium compartment C mounted thereon are movable outwardly of the rack 10. Referring to FIG. 3, the sliding tray assembly 12 includes an inside L-shaped channel 12a and an outside L-shaped channel 12b which are welded or otherwise attached to support bars 12c and 12d extending there-between. L-shaped channels 12e and 12f are also attached to the spaced channels 12a and 12b by welding or other suitable means and include vertical portions such as 12g which serve to securely mount a compartment C with the tray assembly 12. A handle 12h is attached by welding or other suitable means to the channel 12e so that the sliding tray assembly 12 and compartment C mounted thereon can be pulled outwardly or pushed inwardly with respect to the rack 10. Roller means generally designated as 23 are mounted with the spaced channels 12a and 12b in order to rollably mount the sliding tray assembly 12 and compartment C for movement along the track means 22.

The track means 22 includes outside track section 24 adapted to receive the rolling means mounted with spaced channel 12b and inside track section 25 adapted to rollingly mount the track means 23 for the inside, spaced channel 12a.

The outside track section 24 includes an L-shaped channel 24a attached onto horizontal rack rods 10f and 10c and to vertical legs 10e and 10b of the rack 10. The channel 24a includes a horizontal portion 24b having a ridge 24c extending the length thereof and the side 24d is enlarged or flared to form another ridge to further confine the rolling means 23 in a manner to be described hereinafter. Another L-shaped channel 26 is welded or otherwise attached to the vertical legs 10e and 10b at the top of the channel 24a whereby horizontal portion 26a cooperates with the channel 24a to provide a C-shaped outside channel section 24.

The inside track section 25 includes an inverted T-shaped channel 27 mounted onto support rods 10f and 10e in position to receive the roller means 23 attached with tray channel 12a. The channel 27 actually forms the inside track section 25 and includes horizontal, lower track portions 27a having ridges 27b running the length thereof. The horizontal track portions 27a further include enlarged sides 27c which provide means for further confining the wheel means 23 of the tray channel 12a in a manner to be described hereinafter.

A flat bar 28 is mounted by means of bolts 28a onto vertical portion 27d of the inverted T-shaped track channel 27 in order to provide an upper track portion for the inside track section 25. Further, the bar 28 cooperates with the channel 27 to provide two adjacent C-shaped track sections to confine wheel means 23. The L-shaped, ridged channel 24a and the inverted T-shaped channel 27 as well as the other channels and bars used are formed of extruded aluminum or other suitable means; however, other material may be used.

The roller means 23 for each tray channel 12a and 12b are identical, except, of course, for position in either outside track section 24 or inside track section 25. The roller means 23 includes bottom rollers 29 and 30 which are mounted in proximity to each other onto the vertical portions of the tray channels 12a and 12b. The rollers 29 and 30 are of a sealed bearing variety and are mounted with the tray channels 12a and 12b by nuts such as 29a which threadedly mount bearing shafts such as 29b, which extend through the tray channel 12a or 12b. The rollers 29 and 30 are grooved at 29c and 30c in order to ride in the lower track ridges 27b and 24c of the inside and outside track sections, respectively. The rollers 29 and 30 are positioned to support the weight of the compartment C in each tray assembly 12 when filled with water. The outer flared sides such as 27c of the T-shaped track 27 cooperates with the center ridges 27 b to confine the grooved wheels 29 and 30.

The roller means 23 further includes an upper roller 31 which is mounted with the vertical portions of the tray channels 12a and 12b in position to continually engage the undersides of the channel 26 and the bar 25. The rollers 31 may be stainless steel, sealed bearing rollers and are positioned near the rear end 12i and 12j of the tray channels 12a and 12b, respectively, in order to maintain the tray assembly 12 and the compartment C mounted thereon in a substantially horizontal position when the compartment C has been pulled outwardly to the position of the compartment C'.

A rear stop bar 32 is attached by welding or other suitable means over the rear end of the inverted T-shaped channel 27 in order to automatically stop the sliding tray assembly 12 in a position of total confinement within the rack 10. Similarly, a stop bar 33 is mounted between the front end of the inverted T-shaped channel 27 and the electrical conduit 18 in order to limit the movement outwardly of the sliding tray assembly 12 and compartment C.

The sliding tray assemblies 12 are thus independently mounted within the rack 10 and serve to contain a plurality of aquarium compartments C in a position of easy access while storing such compartments using a minimum amount of actual floor space. The roller means 23 serve to mount the sliding tray assemblies 12 and compartment C outwardly to the position of compartment C' while maintaining the compartment C' in a completely horizontal position thereby avoiding any spillage.

It is within the scope of this invention to mount multi-unit aquariums A back to back by attaching the rear legs 10d and 10e of one unit A to the rear legs of another unit, which serves to even further balance the compartments C against tilting. The ability to conveniently store such a plurality of aquarium compartments C in such a confined area allows the user to provide an identical environment for all of the compartments C in a minimum amount of floor space while providing for ease in access to each compartment.

The foregoing disclosure and description of the invention are illustrative and explanatory thereof, and various changes in the size, shape and materials as well as in the details of the illustrated construction may be made without departing from the spirit of the invention.

I claim:

1. A multiple unit aquarium for isolating aquatic animals for research or the like, cmprising:
   a rack;
   a plurality of aquarium compartments;
   a plurality of sliding tray assemblies mounted in said rack for supporting said aquarium compartments;
   said rack including oppositely mounted upper and lower track members for receiving a sliding tray assembly;
   each of said sliding tray assemblies including:
   a tray member for supporting one of said aquarium compartments;
   said tray member including a first set of rollers mounted on each side thereof in rolling engagement with said lower track members and a second set of rollers mounted on each side of said tray member in rolling engagement with said upper track members whereby said tray member is movable outwardly of said rack;
   said first set of rollers including rollers having grooves circumferentially thereof; and
   each of said lower track members having center ridges running the length thereof for receiving said rollers of said first set whereby said aquarium compartments are maintained horizontal even when moved outwardly from said rack.

2. The structure set forth in claim 1, including:
   said rack including front and rear vertical frame members, said tray assemblies and aquarium compartments being confinable within said frame members; and
   two of said racks being attachable by attaching means for attaching said vertical rear frame members together whereby two multiple unit aquariums are mounted back to back.

3. The structure set forth in claim 1, including:
said rack includes outside track assemblies forming upper and lower track members and inside track assemblies forming upper and lower track members;
each pair of said inside track assemblies including a T-shaped channel attached to a flat bar member for forming said inside track assemblies; and
each of said outside track assemblies being formed of an L-shaped channel having a flat bar portion mounted thereon.

4. The structure set forth in claim 1, including:
electrical conduit means mounted with said rack for receiving and confining electrical wiring, said conduit means including outlet means for providing an electrical outlet in proximity to said aquarium compartment.

5. The structure set forth in claim 1, including:
stop means attached with said rack to limit the movement of said tray and aquarium compartment outwardly of said rack.

* * * * *